Aug. 5, 1969    E. E. SMITH ET AL    3,459,082
CROP DISPOSAL DEVICE
Filed Sept. 19, 1967    5 Sheets-Sheet 1
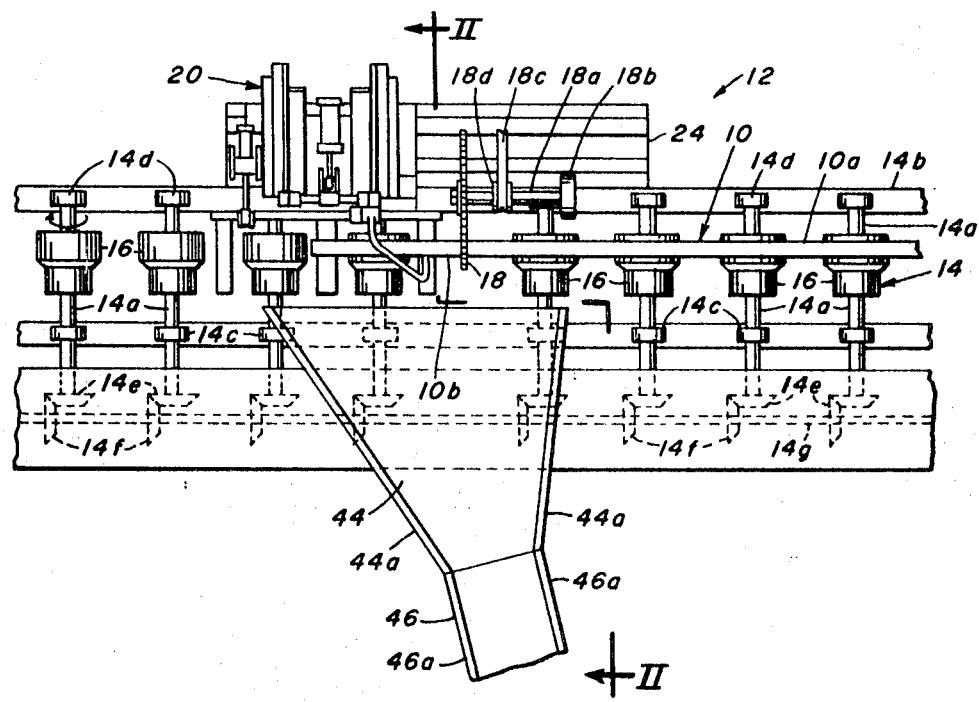
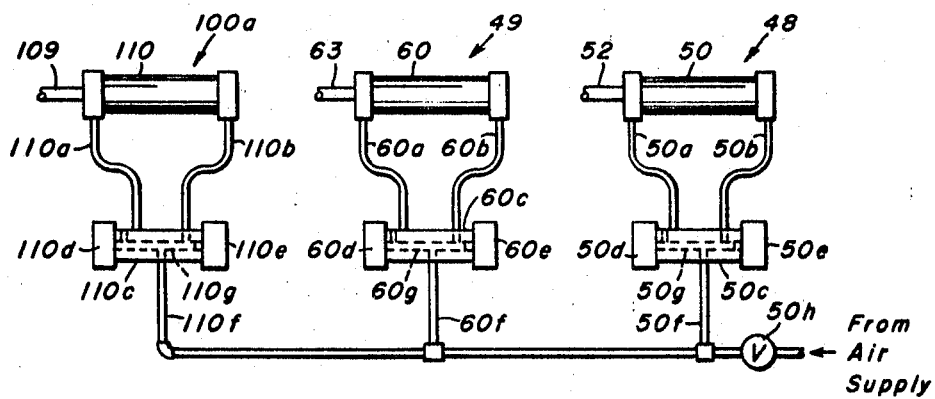
INVENTORS.
EUGENE E. SMITH &
ROBERT H. CANNON
By Donald G. Dalton
Attorney Aug. 5, 1969     E. E. SMITH ET AL     3,459,082
CROP DISPOSAL DEVICE
Filed Sept. 19, 1967     5 Sheets-Sheet 2
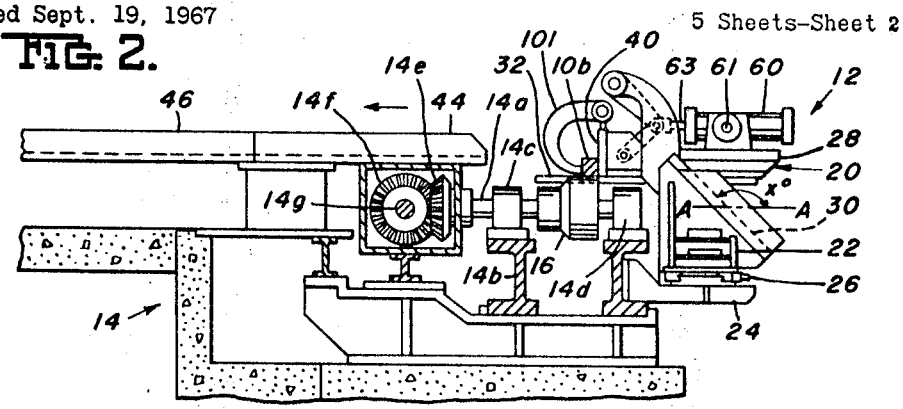
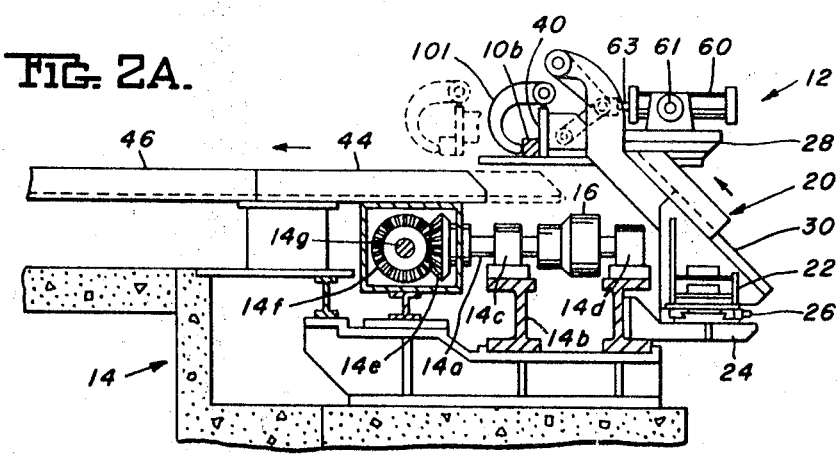
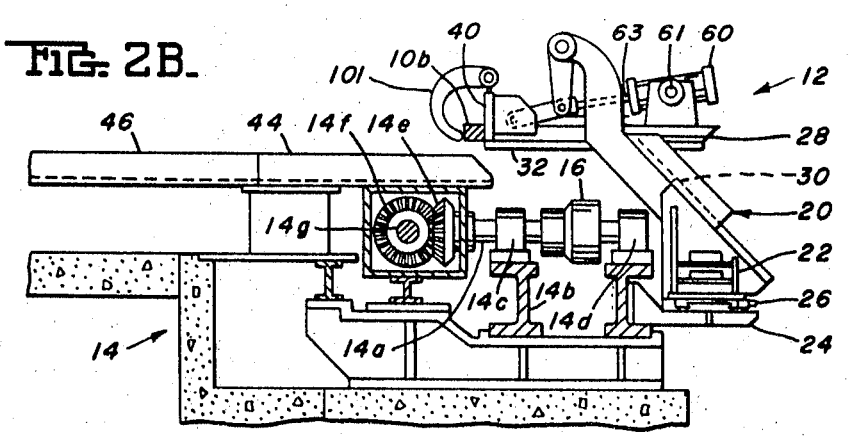
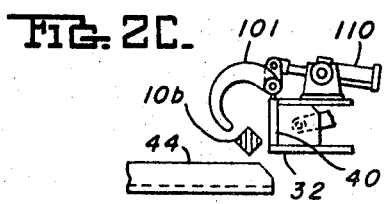
INVENTORS.
EUGENE E. SMITH &
ROBERT H. CANNON
By Donald G. Dalton
Attorney INVENTORS.
EUGENE E. SMITH &
ROBERT H. CANNON
By Donald G. Dalton
Attorney INVENTORS.
EUGENE E. SMITH &
ROBERT H. CANNON
By
Donald G. Dalton
Attorney Aug. 5, 1969

E. E. SMITH ET AL 3,459,082

CROP DISPOSAL DEVICE

Filed Sept. 19, 1967

INVENTORS.
EUGENE E. SMITH &
ROBERT H. CANNON

By Donald G. Dalton

Attorney

United States Patent Office 3,459,082
Patented Aug. 5, 1969

3,459,082
CROP DISPOSAL DEVICE
Eugene E. Smith, East Gary, and Robert H. Cannon, Gary, Ind., assignors to United States Steel Corporation, a corporation of Delaware
Filed Sept. 19, 1967, Ser. No. 668,858
Int. Cl. B26d 7/06, 1/14; B23d 19/00
U.S. Cl. 83—153
17 Claims

ABSTRACT OF THE DISCLOSURE

This invention relates to apparatus for cutting elongated members into a first portion having a predetermined length and a crop or scrap portion and, more particularly, to a crop disposal device for such apparatus. This crop disposal device has a frame, a table movable on the frame from a first position adjacent the conveying means to a second position away from the conveying means, and supporting means on the table to prevent the crop portion from falling between and from the rollers. The supporting means also supports the crop portion when the table moves from the first position to the second position. The supporting means may release the crop portion or alternatively kickoff. Means are movable on the table from a starting position when the table is in the second position to a remote position where it moves the crop portion from the supporting means and clear of the conveying means.

BACKGROUND OF THE INVENTION

Heretofore in the cutting of elongated steel mill products, such as billets, rails and the like, into a first portion of predetermined length and a crop portion or crop having a length in the range of about 1½ feet to over 3 feet, the heated elongated product is moved by the mill roller table adjacent a plurality of circular steel saws, which saws cut the elongated product to the predetermined lengths. The predetermined length of elongated product continues along the mill roller table for further processing and the crop falls between the rollers into a chute or the like for conveyance to a scrap pile. In some mills space limitations prevent the use of a chute and the like beneath the rollers and the crop is removed from the roller table manually with the aid of tongs, moved from the roller line and tossed into a scrap car or the like.

This conventional manual method of removing crops from the roller table has the following disadvantages:

(1) Two or more operators are required to handle the red-hot crops;

(2) Because of the heat from the roller line and because some of the crops may weigh in excess of about 100 pounds, the operators can only work in short shifts of about one hour each, thereafter being relieved by another crew of operators which takes over for a similar period;

(3) This manual operation is unsafe as there is the danger that the crops will slip from the tongs during the hauling, dragging and heaving, thereby causing serious burns to the operators;

(4) The operators, waiting adjacent the roller line to grasp a crop after the saws have completed their cuts, are in a hazardous position if the crop should rest askew on the roller table since the adjacent saw, having completed its cut and being automatically retracted upwardly away from the roller line, may contact the crop thus driving the crop off the roller line and into contact with the operators;

(5) The myriad hot and sizable sparks caused by the sawing operation can also burn the operators waiting for the crops adjacent the saw;

(6) The manual removal of the crops across the rollers causes excessive wear on the rollers and replacement of the rollers with resultant maintenance of and "down" time of the roller line; and (7) Manual handling is expensive and time consuming.

Conventional devices of this type are shown in the following patents:

| U.S. Patent No.: | Inventor | Issue date |
| --- | --- | --- |
| 753,293 | McMurty | 3/1/04 |
| 850,190 | Stevens | 4/16/07 |
| 1,606,280 | Willie | 11/9/26 |
| 1,637,420 | Klein | 8/2/27 |
| 1,800,443 | Dustan, et al. | 4/14/31 |
| 1,808,396 | Biggert, et al. | 6/2/31 |
| 2,259,956 | Jones | 10/21/41 |
| 2,368,152 | McWilliams, et al. | 1/30/45 |
| 2,391,008 | Bucko | 4/2/45 |
| 2,433,734 | Bucko | 12/30/47 |

OBJECTS OF THE INVENTION

It is the general object of the present invention to avoid and overcome the foregoing and other difficulties of and objections to prior art practices by the provision of an improved crop disposal apparatus which:

(1) is safe, efficient, economical and flexible in operation;
(2) eliminates the necessity of manually handling the crops in the dangerous cutting operation, thus freeing the operators for usage elsewhere in the mill where less hazardous working conditions prevail;
(3) speeds up the further processing of the cut elongated product after it has been sawed to the predetermined length;
(4) performs all the required crop handling operations and is simple and rugged in operation; and
(5) is easily fabricated utilizing simple, available, mill materials such as bars and plates.

BRIEF SUMMARY OF THE INVENTION

The aforesaid objects of this invention, and other objects which will become apparent as the description proceeds, are achieved by providing apparatus for cutting an elongated member into a first portion having a predetermined length and a crop portion or crop and having conveying means provided with spaced rollers for supporting and conveying the elongated member along a path of movement, cutting means adjacent the conveying means for cutting the elongated member into the first portion and the crop portion and a crop disposal device disposed adjacent the conveying means further along the path of movement from the cutting means for removing the crop portion from the apparatus.

The crop disposal device has a frame, a table movable on the frame from a first position adjacent the conveying means to a second position away from the conveying means, supporting means on the table for preventing the crop portion from falling between and from the rollers and for supporting the crop portion when the table moves from the first to the second position. The supporting means may then release the crop portion or alternatively kickoff means are movable on the table from a starting position when the table is in the second position to a remote position to move the crop portion from the supporting means clear of the conveying means.

BRIEF DESCRIPTION OF THE GENERAL VIEWS OF THE DRAWINGS

For a better understanding of this invention reference should be had to the accompanying drawings, wherein like numerals of reference indicate similar parts throughout the several views and wherein:

FIGURE 1 is a fragmentary plan view of cutting apparatus for cutting an elongated member into predetermined lengths and end crop portions and showing the conveying means, one of the cutting means and a crop disposal device of this invention and an end portion of the elongated member during the cutting operation;

FIGURE 2 is a fragmentary side elevational view taken along the line II—II of FIGURE 1 in the direction of the arrows;

FIGURES 2A–2C are views similar to FIGURE 2 showing the operation of the crop disposal device;

FIGURE 5 is a schematic view of a fluid system for operating the drive means for the crop disposal device;

Figure 3:
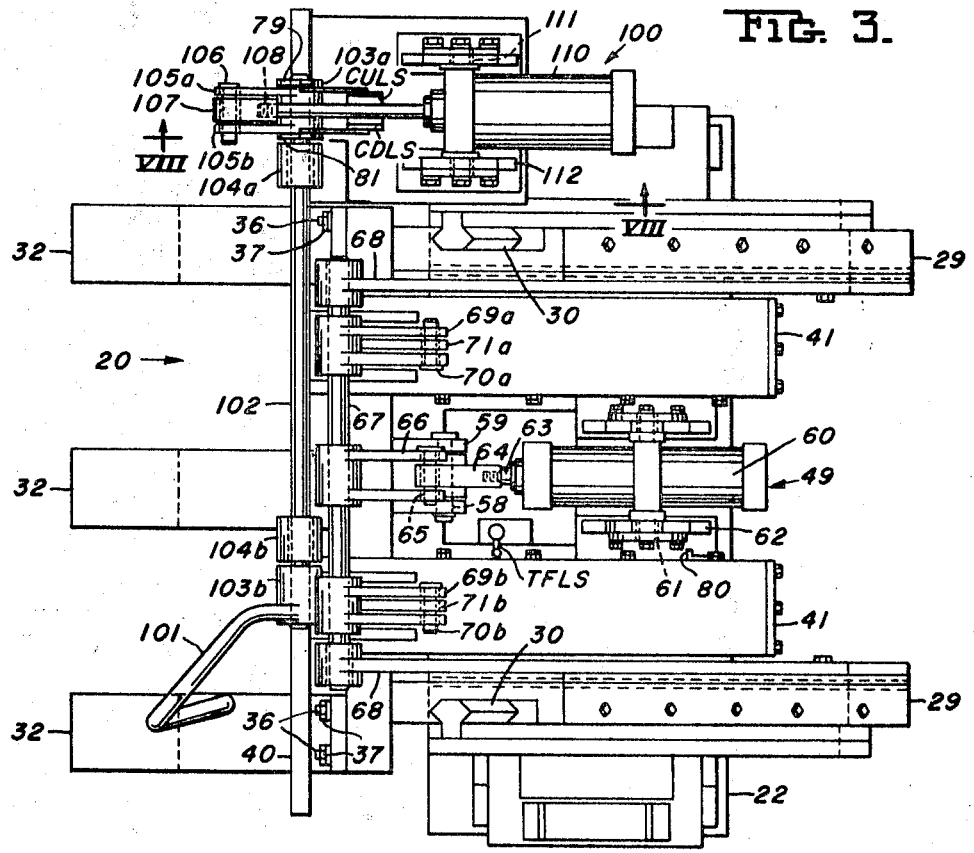
FIGURE 3 is an enlarged plan view of the crop disposal device shown in FIGURE 1 with the fluid cylinder for the table reciprocating mechanism and the billet removed for clarity.

Although the principles of this invention are broadly applicable to removal of the scrap portion of a workpiece from a production line, this invention is particularly adapted for use in conjunction with the removal of crop portions or crops from elongated heated members from a cutting mill roller line and hence it has been so illustrated and will be so described.

DETAILED DESCRIPTION

With specific reference to the form of this invention ilustrated in the drawings, and referring particularly to FIGURES 1, 2, an apparatus for cutting an elongated member, such as a heated billet 10 (FIGURE 1) or the like, into a first portion 10a (FIGURE 1) having a predetermined length and a crop portion or crop 10b (FIGURES 1, 2–2C) is indicated generally by the reference numeral 12 (FIGURE 1).

This apparatus 12 has a conveying means 14 (FIGURES 1, 2) provided with a plurality of spaced rollers 16 (FIGURES 1, 2–2C, 7A–7B) for supporting and conveying the heated billet 10 along a path of movement from right to left as viewed in FIGURE 1. Each roller 16 is mounted on a shaft 14a (FIGURES 1, 2–2C, 7A–7B) journaled in a frame 14b at 14c, 14d and driven by a gear 14e on the shaft 14a nesting with a gear 14f (FIGURES 1, 2–2C) on a drive shaft 14g. The rollers 16 rotate in the direction of the arrows shown in FIGURE 1. One of the cutting means, such as a circular saw 18 (FIGURE 1), is disposed adjacent the conveying means 14 for cutting the heated billet 10 into the first portion 10a and the crop 10b. The saw 18 is mounted on a shaft 18a (FIGURE 1) having a fly wheel 18b on the opposite end thereof. This shaft 18a is driven by a belt 18c disposed about a pulley 18d on the shaft 18a. The saw 18 is oscillatable between a rest portion (not shown in FIGURE 1) and a cutting position shown in FIGURE 1 by an oscillating mechanism (not shown).

In addition the apparatus 12 has a crop disposal device 20 (FIGURES 1, 2–2B, 3, 4) disposed to the left of the saw 18 (as viewed in FIGURE 1) for removing the crop 10b from the apparatus 12.

CROP-DISPOSAL DEVICE 20

Figure 4:
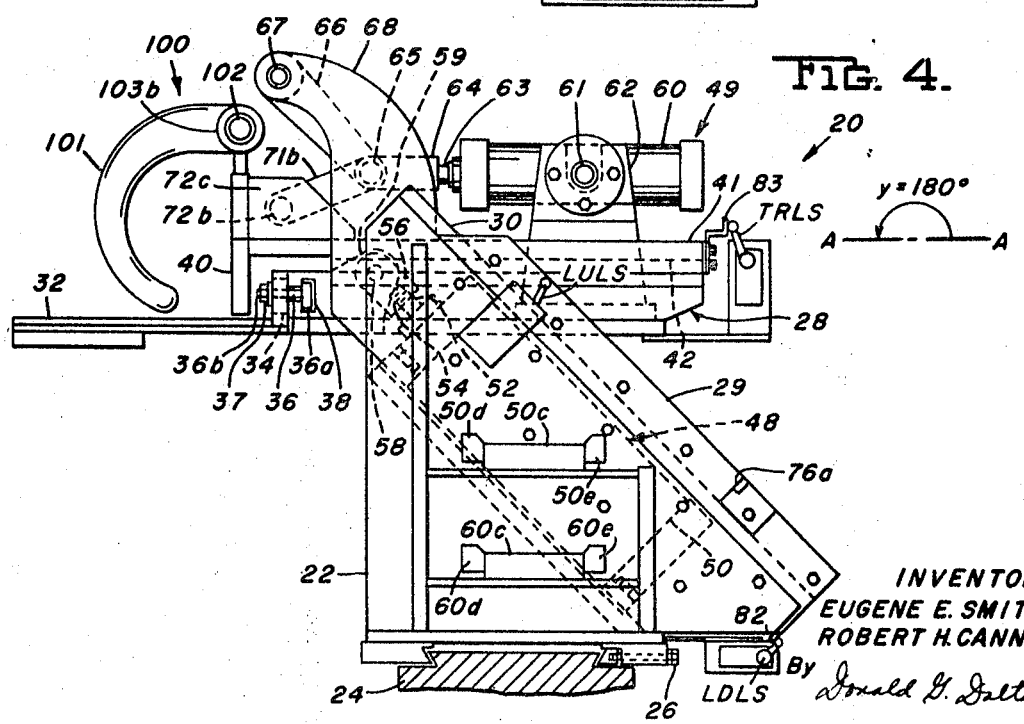
FIGURE 4 is a side elevational view of the crop disposal device shown in FIGURE 3 with the operating means for the clamping mechanism and the billet removed for clarity.

This crop-disposal device 20 has a frame 22 (FIGURES 2–2B, 3, 4) which is slidably mounted in a base plate 24 (FIGURES 2–2B, 4) projecting from the frame 14a of the conveying means 14. Bolts 26 (FIGURES 2–2B, 4) secure the frame 22 in the base plate 24 in the desired position or spaced relation with respect to the saw 18 depending on the predetermined length of the first portion 10a of the heated billet 10. A table 28 (FIGURES 2–2B, 4) has slide portions 29 (FIGURES 3, 4) which are movable in guides 30 (FIGURES 2–2B, 3, 4) provided in the top portion of the frame 22, which guides 30 are inclined during their forward upward movement at an angle X (FIGURE 2) from the horizontal transverse axis A—A of the conveyor means 14. Angle X in this case (FIGURE 2) is about 135°. The table 28 moves on the guides 30 away from the conveying means 14 from a first or crop-receiving position (FIGURES 2, 4) to a second or crop-disposal position (FIGURE 2A). Supporting means, such as a plurality of pallets 32 (FIGURES 2–2C, 3, 4) are mounted on the table 28 at 34, 36 (FIGURES 3, 4) as hereinafter explained, and are insertable between the rollers 16 (FIGURE 2) when the table 28 is in the first or crop-receiving position of FIGURE 2 to prevent the crop portion 10b from falling between and from the rollers 16. The pallets 32 are adapted to support the crop 10b when the table 28 moves from the first or crop-receiving position (FIGURE 2) to the second or crop-disposal position (FIGURE 2A). As shown in FIGURES 3, 4, each pallet 32 is an L-shaped member having a vertical slot 34 (FIGURE 4) and is secured to the table 28 of the crop-disposal device 20 by a bolt 36 having a head 36a (FIGURE 4) slidable in a slot 38 in the table 28 and its threaded end 36b secured by a nut 37 (FIGURES 3, 4). The slot 34 in the pallet 32 permits vertical positioning of the pallets 32 with respect to the rollers 16 and the slot 38 permits the desired horizontal spacing of the pallets 32 with respect to each other.

Kickoff means, such as the kickoff plate 40 (FIGURES 2–2C, 3, 4), is mounted on slides 41 (FIGURES 3, 4), which slides 41 are movable in guides 42 on the table 28 from a starting position (FIGURES 2A–2B, 3, 4) to a remote position (FIGURE 2C) when the table 28 is in the second or crop-disposal position to move the crop 10b from the pallets 32 and clear of the conveying means 14 into a chute 44 (FIGURES 1, 2–2C) having sides 44a (FIGURE 1) onto a shaker-type conveyor 46 (FIGURES 1, 2–2C) having sides 46a for delivery to disposal means, such as a scrap car (not shown). The slides 41 and guides 42 are disposed at an angle Y (FIGURE 4) from the horizontal transverse axis A—A of the conveying means 14, which angle Y in this case (FIGURE 4) is about 180° during their forward movement from the position of FIGURE 2B to the position of FIGURE 2C.

Having described generally the structure and operation of the apparatus 12 and the crop-removal device 20, the details of the drive means and control means for the table 28 and the kickoff plate 40 and a clamping mechanism 100 will be considered.

DRIVE MEANS

Figure 8:
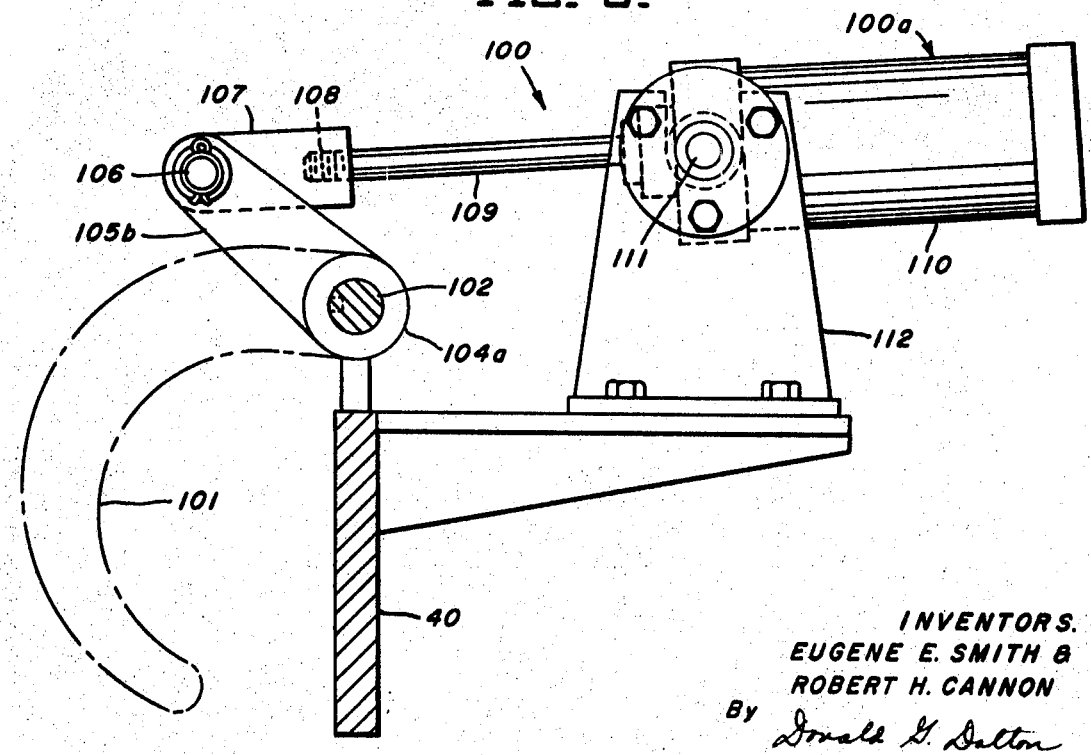
FIGURE 8 is a sectional view along the line VIII—VIII of FIGURE 3 in the direction of the arrows and showing the operating means for the clamping mechanism.

The structure utilized to move the table 28 from the crop-receiving position (FIGURE 2) to the crop-disposal position (FIGURES 2A–2C) is a first operating means or a fluid table reciprocating mechanism 48 (FIGURE 4). For the purpose of moving the kickoff plate 40, a second operating means or a kickoff plate reciprocating mechanism 49 (FIGURES 3, 4) is provided from the starting position (FIGURE 2) to the remote position (FIGURE 2B). Similarly the clamping mechanism 100 has an operating means 100a (FIGURE 8).

TABLE RECIPROCATING MECHANISM

This table reciprocating mechanism 48 has an air cylinder 50 (FIGURES 3, 4, 5) mounted on the frame 22 of the crop-disposal device 20, having its piston rod 52 connected at 54 (FIGURE 4) to an arm 56, which arm 56 is connected by a pin 58 (FIGURES 3, 4) to a pair of stationary ears 59 mounted on the table 28. The air cylinder 50 (FIGURE 5) is connected by suitable lines 50a, 50b to a solenoid-operated air valve 50c, having solenoid coils 50d, 50e, which solenoid-operated air valve 50c is connected by a line 50f through a gate valve 50h to a suitable supply of high pressure fluid, in this case air, indicated by the legend "AIR SUPPLY."

When the coil 50d is energized by the control means as hereinafter explained, the piston 50h is in the position shown in FIGURE 5 and air flows through line 50b into the air cylinder 50 moving the piston rod 52 to the left as viewed in FIGURES 4, 5, with resultant movement of the table 28 up the guides 30 from the crop-receiving position shown in FIGURE 2 to the crop-disposal position shown in FIGURE 2B. Energization of the solenoid coil 50e retracts the table 28.

KICKOFF-PLATE RECIPROCATING MECHANISM 49

This kickoff plate reciprocating mechanism 49 (FIGURES 3, 4, 5) has an air cylinder 60 pivotally mounted at 61 (FIGURES 3, 4) on a bracket 62 upstanding from the table 28 with its piston rod 63 connected to an arm 64. The arm 64 (FIGURES 3, 4) is connected by a pin 65 to a bifurcated link 66 fixed to a longitudinal shaft 67 journaled in brackets 68 upstanding from the table 28. In order to equalize the rotational force on the longitudinal shaft 67, bifurcated links 69a, 69b (FIGURE 3) fixed on the shaft 67 are connected by pins 70a, 70b respectively to links 71a, 71b respectively, which links 71a, 71b are connected at 72a, 72b (FIGURE 4) respectively, to a bracket 72c (FIGURE 4) upstanding from the kickoff plate slide 41.

Referring to FIGURE 5 and the fluid system for the kickoff plate reciprocating mechanism 49, when solenoid coil 60d is energized by the control means (as hereinafter explained) high pressure air flows through line 60f through solenoid-operated air valve 60c and line 60b to move the piston rod 63 to the left as viewed in FIGURE 4 with resultant movement of the links 66, 69a, 69b and the shaft 67 in clockwise direction (FIGURE 4), thus causing the links 71a, 71b to move the kickoff plate 40 to the left as viewed in FIGURE 4 from the retracted position (FIGURE 2) to the forward position (FIGURE 2C).

It will be understood by those skilled in the art that as shown in FIGURES 1–5, the apparatus 12 may be provided with clamping mechanism 100 for use with short crops 10b in lieu of or together with the pallets 32.

CLAMPING MECHANISM 100

This clamping mechanism 100 (FIGURES 3, 8) has a clamp 101 (FIGURES 2–2C, 3, 4, 8) fixed to a longitudinal shaft 102 at 103b (FIGURES 3, 4, 8), which shaft 102 is journaled at 104a, 104b (FIGURE 3) on the kickoff plate 40. Arms 105a, 105b (in the upper portion of FIGURE 3) project from a hub 103a and are connected by a pin 106 (FIGURES 3, 8) to a clevis 107, which clevis 107 is joined at 108 to a piston rod 109 of an air cylinder 110 pivotally mounted at 111 on brackets 112 upstanding from the kickoff plate 40.

Referring to FIGURE 5, when the solenoid coil 110d is energized by the control means (as hereinafter explained), high pressure air flows through line 110f, the valve 110c and line 110b to move the piston rod 109 to the left, as viewed in FIGURES 3–5, with attendant counterclockwise rotation (FIGURES 2–2C, 4) of the arms 105a, 105b, shaft 102 and the clamp 101 (FIGURE 4) from the retracted position (FIGURES 2C, 3, 4) to the clamping position (FIGURES 2, 2A, 2B) where the clamp 101 secures said crop 10b against the kickoff plate 40.

As hereinbefore mentioned the operation of the drive means is controlled by the control means. This control means will be described with the clamping mechanism included in the description.

CONTROL MEANS

Figure 6:
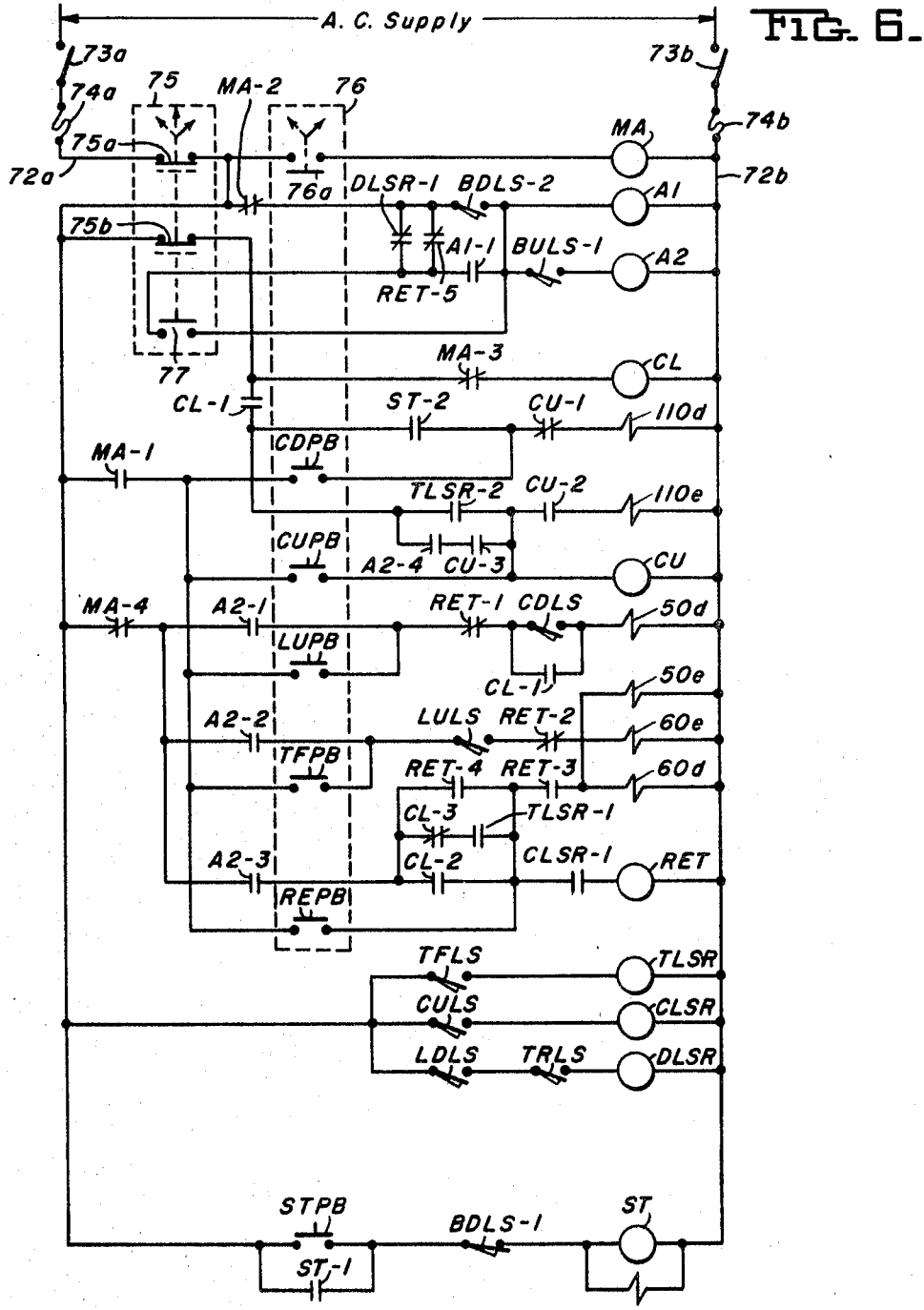
FIGURE 6 is a schematic wiring diagram of the control means associated with the apparatus.

Referring to FIGURE 6, the conductors 72a, 72b extend from a suitable voltage supply indicated by the legend "AC Supply" through main switches 73a, 73b and fuses 74a, 74b to a selector circuit having a pallet selector switch 75 located in the control pulpit (not shown) for the rolling mill (not shown) of which the conveying means 14 is an integral part; a local selector switch 76 located in a panel (not shown) adjacent the crop-disposal device 20 and relay MA. The contacts 75a, 75b of the pulpit selector switch 75 are closed when the clamp 101 is employed as shown by the solid lines in FIGURE 6, and contact 75a is open (dotted line position FIGURE 6) and contact 75b is closed when the clamp 101 is not used. The local selector switch 76 is open (solid line position FIGURE 6) when automatic operation of the apparatus 12 is desired and is closed (dotted line position FIGURE 6) when manual operation of the apparatus 12 is desired. In the first example explaining the operation of the apparatus 12, such apparatus 12 will be operated manually with the clamp 101 in use.

MANUAL OPERATION WITH CLAMP 101

With both the pulpit selector switch 75 and the local selector switch 76 closed, the manual automatic relay MA is energized with resultant closure of normally open contact MA–1. Closure of normally open clamp-down push button CDPB completes a circuit through contact MA–1 and normally closed contact CU–1 with attendant energization of the clamp-down solenoid 110d, thereby clamping the crop 10b against the kickoff plate 40.

Closure of normally open table lift-up push button LUPB completes the circuit through normally closed contact RET–1, and normally closed contact CL–1 and the table lift-up solenoid 50d, thereby raising the table to the position shown in FIGURES 2A, 2B. At the end of the upward movement of the table 28 a normally open limit switch LULS mounted on the frame 22 adjacent the path of movement of the table 28 is closed by a dog 76a (FIGURE 4) on the table 28.

Closure of the normally open kickoff plate forward push button TFPB completes a circuit through push button TFPB, now closed limit switch LULS, normally closed contact RET–2 and kickoff table forward solenoid coil 60e with attendant forward movement of the kickoff plate 40 from the position shown in FIGURES 2, 2A to the position shown in FIGURE 2B. Closure of the clamp-up push button CUPB energizes relay CU, causing closure of contact CU–2, completing a circuit through solenoid coil 110e, thus causing the clamp 101 to retract and closing limit switch CULS and thereby energizing relay CLSR.

In turn closure of the retraction push button REPB for the kickoff plate 40 and the table 28 energizes relay RET through now closed contact CLSR–1, thus causing closure of normally open contact RET–3 and resultant energization of the table retraction solenoid coil 50e and the kickoff plate retraction solenoid coil 60d with attendant movement of the kickoff plate 40 to the retracted position (FIGURES 2, 2A) and the table 28 to the crop-receiving position (FIGURE 2).

MANUAL OPERATION—WITHOUT CLAMP 101

When the pulpit selector switch 75 is turned to the "without clamp" position contacts 75a of the switch 75 are closed and contacts 75b of the switch 75 are open. If the operator does not close the clamp-down push button CDPB, the clamp 101 remains in the open position (FIGURE 2C). The remainder of the operation of apparatus 12 is controlled as explained above in the description of the manual operation with the clamp 101, except that retract relay RET is energized through contacts CL–3 and TLSR–1.

AUTOMATIC OPERATION WITH CLAMP 101

Under these conditions the contact 76a of the local manual-automatic selector switch 76 is open, and contacts 75a and 75b of pulpit selector switch 75 are closed. Relay CL is energized through closed contacts 75a, 75b and MA–3. Closure of the saw tilt push button STPB energizes relay ST through closed limit switch BDLS (FIGURE 6), and also energizes solenoid STS causing the saw to tilt down and cut the product. Contact ST–1 forms a holding circuit around push button STPB. Closure of contact ST–2 completes a circuit through closed selector switch contacts 75a and 75b, now closed CL–1 contact, normally closed CU–1 contact, and clamp-down solenoid 110d, thereby clamping the billet 10.

As the saw 18 completes the cut, the normally closed contact BDLS–1 of limit switch BDLS opens, de-energizing relay ST and solenoid STS and causing the saw 18 to start raising away from the cut product. Simultaneously the normally open contact BDLS–2 of limit switch BDLS closes and energizes relay A1 through selector switch contact 75a and contact MA–2. Contact A1–1 and contact RET–5 form a holding circuit around limit switch BDLS since such switch BDLS will re-open as the saw 18 rises. Closure of contact A1–1 also sets up the A2 relay circuit of contact BULS–1 so that closure of limit switch BULS (not shown) when the saw 18 is up will energize relay A2, which relay A2 actually starts the sequence for disposing of the crop 10b. Auto-Start push button 77 may also be used to start the sequence in the event limit switch BDLS fails.

Closure of contact A2–1 completes a circuit through normally closed contact MA–4, normally closed contact RET–1, now closed clamp-down limit switch CDLS (FIGURE 3), and solenoid coil LUS, thereby raising the table 28. A normally open limit switch LULS (FIGURE 4)) closes as the table 28 reaches its upper extreme position.

The closed contact A2–2 of energized relay A–2, closed limit switch LULS, normally closed contact RET–2 of deenergized relay RET provide a closed circuit through kickoff plate forward solenoid coil 60e so that the kickoff plate 40 moves from the retracted position (FIGURES 2, 2A) to the forward position (FIGURE 2B) with resultant closure of normally open limit switch TFLS (mounted on the frame 22 of the crop-disposal device 20) by a dog 80 (FIGURE 3) on the slide 41 for the kickoff plate 40, thereby energizing relay TLSR.

Simultaneously closure of normally open contact TLSL–2 of energized relay TLSR energizes relay CU, thereby closing normally open contact CU–2 of relay CU and energizing clamp-up solenoid coil 110e to retract the clamp 101 from the clamping position (FIGURES 2–2B) to the open position (FIGURE 2C). Now closed contacts A2–4 and CU–3 form a holding circuit around contact TLSR–2.

Movement of the clamp 101 to the open position (FIGURE 2C) causes clamp-up cam 79 (FIGURE 3) on shaft 102 to close clamp-up limit switch CULS (FIGURES 3, 6) and energizes relay CLSR. As a result relay RET is energized by a closed circuit through now closed contact A2–3 of energized relay A2, now closed contact CL–2 of energized relay CL, now closed contact CLSR–1 of energized relay CLSR so that the resultant closure of normally open contact RET–3 will energize table down solenoid coil 50e and kickoff plate retraction solenoid coil 60d, thus retracting the table 28 and kickoff plate 40. In addition normally open holding contact RET–4 is closed and normally closed holding contact RET–5 is opened. However, the holding circuit for relays A1 and A2 is maintained by normally closed contact DLSR–1.

When the table 28 reaches the retracted crop-receiving position (FIGURE 2), limit switch LDLS (FIGURE 4) on the frame 22 of the crop-disposal device 20 is closed by a dog 82 (FIGURE 4) on the table 28. With retraction of the kickoff plate 40 to the retracted position (FIGURES 2–2B) limit switch TRLS on the frame 22 is closed by dog 83 (FIGURE 4) on the slide 41. Closure of both switches LDLS and TRLS energizes relay DLSR which opens normally closed contact DLSR–1 with resultant deenergization of the relays A1, A2 and return of the control means to the starting conditions for the next cycle of operation of the apparatus 12.

AUTOMATIC OPERATION WITHOUT CLAMP 101

In this example the contacts 75b of pulpit selector switch 75 are open so that relay CL is not energized and the above-described clamping circuits are not energized. However the contacts 75a of the pulpit selector switch 75 are closed, thus permitting operation of the table-elevating circuit, kickoff plate advancing circuit, table retracting circuit and kickoff plate retracting circuits as described.

ALTERNATIVE EMBODIMENTS

Figure 7A:
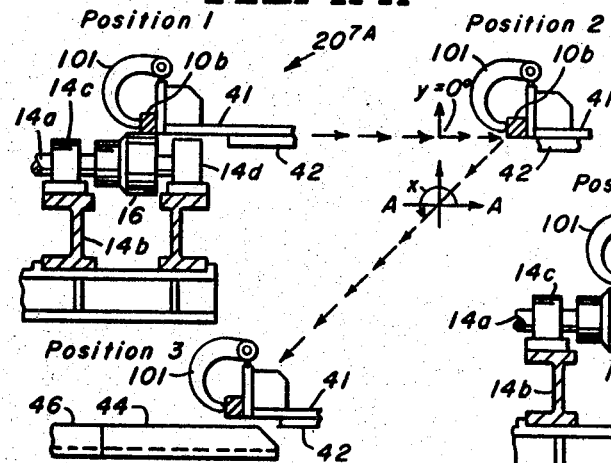
FIGURE 7A is a view similar to FIGURE 2 diagrammatically showing an alternative embodiment of the crop disposal device and employing clamp means in lieu of pallet means for delivering the crop portion to a conveyor means below the apparatus.

It will be understood by those skilled in the art that alternatively as shown in FIGURE 7A the pallets 32 may be dispensed with and the crop 10b held by a plurality of two or more clamps 101. The clamps 101 move with the crop 10b on the slide 42 to the right from the solid line position to the dotted line position identified by the legend "Position 2." The angle 4 in this case is about 0°. Thereafter the clamps 101 and the crop 10b are moved downwardly with the table 28 on the slide 30 (here angle X is about 135°) to the dotted line position (Position 3) where the clamps 101 open releasing the crop 10b to the chute 44

Figure 7B:
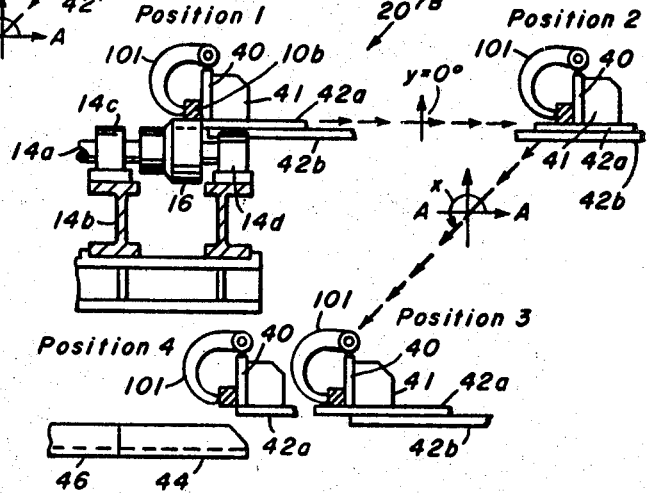
FIGURE 7B is a view similar to FIGURE 7A showing another alternative embodiment employing clamp means and pallet means for delivery of the crop portion to a conveying means below the apparatus.

In FIGURE 7B one or more clamps 101 are used in conjunction with the pallets 32. The kickoff plate 40 and slide 41 are slidable on a second slide 42a, which slide 42a carries the pallets 32 and slides in a guide 42b on the table 28. From the solid line position (Position 1) the clamp 101, crop 10b and pallets 32 are moved on the guide 32b to the right to the dotted line position (Position 2). The angle 4 is about 0°. Then the clamp 101, crop 10b and pallets 32 and the table 28 move on the guide 30 on the frame 22 to the dotted line position (Position 3). Thereafter the clamp 101, kickoff plate and crop 10b move to the left on the slide 42a to clear the pallets 32 and the clamp 101 opens, dropping the crop 10b onto the chute 44.

It will be appreciated that the angle X which the slide 29 makes with the horizontal axis A—A of the apparatus 12 may be greater than about 0° and less than 360°. The angle Y which slides 42, 42a, 42b make with the horizontal axis A—A of the apparatus 12 is generally about 0° or 360° for rectangular and square cross sectioned billets 10, but in the case of billets 10 having round cross sections and the like, the angle Y may have values of greater than about 0° and less than about 180°.

SUMMARY OF THE ACHIEVEMENT OF THE OBJECTS OF THE INVENTION

It will be recognized by those skilled in the art that the objects of this invention have been achieved by providing an improved apparatus for cutting elongated members and an improved crop-disposal device which are safe, efficient, economical and flexible in operation; eliminate the necessity of manually handling of the crops in the dangerous cutting operation, thus freeing the operators for usage elsewhere in the mill where less hazardous working conditions prevail; speed up the further processing of the cut elongated product after it has been sawed to the predetermined length; perform all the required crop-handling operations and are simple and rugged in operation; and are easily fabricated utilizing simple, available mill materials such as bars and plates.

While in accordance with the patent statutes preferred and alternative embodiments of this invention have been illustrated and described in detail, it is to be particularly understood that the invention is not limited thereto or thereby.

We claim:
1. Apparatus for cutting an elongated member into a first portion having a predetermined length and a crop portion and having:
 (a) conveying means provided with spaced rollers for supporting and conveying said elongated member along a path of movement;
 (b) cutting means adjacent said conveying means for cutting said elongated member into said first portion and said crop portion; and
 (c) a crop disposal device disposed adjacent said conveying means further along said path of movement from said cutting means for removing said crop portion from said apparatus and having:
  (1) a frame;
  (2) a table movable on said frame from a first position adjacent said conveying means to a second position away from said conveying means; and
  (3) supporting means on said table to prevent said crop portion from falling between and from said rollers and adapted to support said crop portion when said table moves from said first position to said second position.

2. The apparatus recited in claim 1 wherein said supporting means is then operable to release said crop portion.

3. The apparatus recited in claim 1 wherein said supporting means is on said table and having kickoff means movable on said table from a starting position when said table is in said second position to a remote position to move said crop portion from said supporting means and clear of said conveying means.

4. The apparatus recited in claim 1 wherein said supporting means is movable on said table away from said conveying means.

5. The apparatus recited in claim 1 wherein said supporting means is movable on said table away from said conveying means when said table is in said second position.

6. The apparatus recited in claim 1 wherein said supporting means is movable on said table away from said conveying means when said table is in said first position.

7. For apparatus for cutting an elongated member into a first portion having a predetermined length and a crop portion and having conveying means provided with spaced rollers for supporting and conveying said elongated member along a path of movement and cutting means adjacent said conveying means for cutting said elongated member into said first portion and said crop portion, a crop disposal device disposed adjacent said conveying means further along said path of movement from said cutting means and having:
 (a) a frame;
 (b) a table movable on said frame from a first position adjacent said conveying means to a second position away from said conveying means;
 (c) supporting means on said table to prevent said crop portion from falling between and from said rollers and adapted to support said crop portion when said table moves from said first position to said second position.

8. The apparatus recited in claim 7 wherein said supporting means is then operable to release said crop portion.

9. The apparatus recited in claim 7 wherein said supporting means is on said table and having kickoff means movable on said table from a starting position when said table is in said second position to a remote position to move said crop position from said supporting means and clear of said conveying means.

10. The apparatus recited in claim 7 wherein said supporting means is movable on said table away from said conveying means.

11. The apparatus recited in claim 7 wherein said supporting means is movable on said table away from said conveying means when said table is in said second position.

12. The apparatus recited in claim 7 wherein said supporting means is movable on said table away from said conveying means when said table is in said first position.

13. The apparatus recited in claim 8 wherein said supporting means is a plurality of pallets, a kickoff plate and a clamp, said clamp and kickoff plate being movable with respect to said pallets to clear said pallets, said clamp being then operable to release said crop portion.

14. The apparatus recited in claim 7 and having a first operating means for moving said table between said first position and said second position and a first control means associated with said first operating means for controlling said movement of said table.

15. The apparatus recited in claim 7 and having a second operating means for moving said supporting means on said table away from said conveying means and a second control means connected to said second operating means for controlling said movement of said supporting means.

16. The apparatus recited in claim 7 and having a third operating means connected to said supporting means for opening and closing said supporting means and a third control means associated with said third operating means for controlling the operation of said supporting means.

17. The apparatus recited in claim 7 wherein said supporting means is on said table and having kickoff means on said table adjacent said supporting means, a second operating means connected to said kickoff means for moving said kickoff means from a starting position when said table is in said second position to a remote position where said kickoff means moves said crop portion from said supporting means, and a second control means connected to said second operating means for controlling the movement of said kickoff means with respect to said supporting means.

References Cited

UNITED STATES PATENTS

| | | | |
|---|---|---|---|
| 1,504,574 | 8/1924 | Moses | 83—156 X |
| 2,397,192 | 3/1946 | Meyerbach | 83—157 |
| 3,222,970 | 12/1965 | Hill | 83—157 |
| 3,304,824 | 2/1967 | Hess et al. | 83—167 X |

FRANK T. YOST, Primary Examiner

U.S. Cl. X.R.

83—156, 157, 160, 470